United States Patent [19]

Madsack

[11] Patent Number: 5,556,350

[45] Date of Patent: Sep. 17, 1996

[54] DIFFERENTIAL DRIVE

[75] Inventor: Heinz Madsack, Overath, Germany

[73] Assignee: GKN Viscodrive GmbH, Germany

[21] Appl. No.: 297,156

[22] Filed: Aug. 29, 1994

[30] Foreign Application Priority Data

Aug. 31, 1993 [DE] Germany ............... 43 29 248

[51] Int. Cl.⁶ ............................. B60K 17/20; B60K 23/04
[52] U.S. Cl. ............................................................. 475/85
[58] Field of Search ................................................. 475/85

[56] References Cited

U.S. PATENT DOCUMENTS

| 2,743,792 | 5/1956 | Ransom ............................ 475/85 |
| 4,058,027 | 11/1977 | Webb ............................... 475/85 |
| 4,836,051 | 6/1989 | Guimbretie e ................... 475/85 |
| 4,905,808 | 3/1990 | Tomita et al. ................. 192/85 AA |
| 4,966,268 | 10/1990 | Asano et al. .................. 192/58 C |
| 4,982,808 | 1/1991 | Taureg et al. ................. 180/233 |
| 5,007,515 | 4/1991 | Shimizu ........................ 192/58 A |
| 5,007,885 | 4/1991 | Yamamoto et al. ............. 475/231 |
| 5,012,908 | 5/1991 | Kobayashi et al. ............ 192/57 |
| 5,031,743 | 7/1991 | Morishita et al. ............ 192/58 C |
| 5,036,963 | 8/1991 | Murata ......................... 192/35 |
| 5,056,640 | 10/1991 | Yamamoto ..................... 192/85 AA |
| 5,063,738 | 11/1991 | Asano et al. ................. 60/329 |
| 5,070,975 | 12/1991 | Tanaka et al. ................. 192/35 |
| 5,080,187 | 1/1992 | Asano et al. ................. 180/248 |
| 5,127,503 | 7/1992 | Gratzer ......................... 192/58 B |
| 5,145,470 | 9/1992 | Hagiwara ....................... 475/85 |
| 5,178,249 | 1/1993 | Haga et al. .................... 192/35 |
| 5,197,583 | 3/1993 | Sakai et al. ................... 192/35 |
| 5,259,488 | 11/1993 | Oberdörster et al. ......... 192/58 A |

FOREIGN PATENT DOCUMENTS

| 0480175 | 4/1992 | European Pat. Off. . |
| 0549828 | 7/1993 | European Pat. Off. . |
| 938813 | 7/1949 | Germany . |
| 4103054A1 | 8/1991 | Germany . |
| 4032245 | 3/1992 | Germany . |
| 1220728 | 9/1989 | Japan . |
| 2120530 | 5/1990 | Japan . |
| 369829 | 3/1991 | Japan . |
| 2202602 | 9/1988 | United Kingdom . |
| 2222232 | 2/1990 | United Kingdom . |

*Primary Examiner*—Dirk Wright
*Attorney, Agent, or Firm*—Dinnin & Dunn, P.C.

[57] ABSTRACT

A differential drive with a differential housing (13) supported in a housing (12) has driving bevel gears (16, 17) and differential bevel gears (22, 23) which engage one another. The differential housing (13) includes a bearing projection (41) with a cylindrical bearing face (39). Furthermore, the differential housing (13) includes a radially extending connecting face (40) with bores (42) to receive coupling pins. A viscous coupling (26) is supported on bearings (55, 57) in a flange housing (47) flanged to the housing (12). The viscous coupling (26) includes a bearing bore (46) which associates the viscous coupling with the differential drive, receives a bearing projection (41) of the differential housing (13), with the flange housing (47) supporting the bearing carrier. Furthermore, a plug-in shaft (58) is provided which, for connecting the hub (32), includes teeth and which itself may be plugged into a toothed bore (60) of the driving bevel gear (17). The coupling housing (27) also includes bores (44) to receive coupling pins (45). After the viscous coupling (26) has been prefitted in the flange housing (47), an axial plug-in assembly procedure is carried out where coupling pins (45) and the plug-in shaft (58) establish a connection with the housing (12) of the differential drive.

6 Claims, 3 Drawing Sheets

DIFFERENTIAL DRIVE

BACKGROUND OF THE INVENTION

The invention relates to a differential drive, especially for motor vehicles, with a rotatably driven differential housing supported in a housing. The drive has two driving bevel gears equi-axially arranged and rotatably supported in the differential housing. At least two differential bevel gears engage the driving bevel gears and are rotatably supported at the differential housing around a rotational axis, which intersects the rotational axis of the driving bevel gears at a right angle. Also included is means for arranging a viscous coupling next to the differential housing. The viscous coupling includes a coupling housing and a hub which are arranged coaxially around one another and rotatably relative to one another. An operating chamber is formed between the coupling housing and hub. Radially overlapping outer plates and inner plates, in a certain sequence, are non-rotatably associated with the coupling housing and the hub within the operating chamber. The remaining part of the operating chamber is at least partially filled with a highly viscous medium especially silicone oil. The viscous coupling may be arranged between the differential housing and a driving bevel gear, with the coupling housing of the viscous coupling connectable to the differential housing and its hub connected by a driving bevel gear and coupling means.

A differential drive is described in unexamined patent application DE 41 03 054 A1, published Aug. 14, 1991. The viscous coupling is arranged next to the drive housing of the differential drive. To reduce vibrations, the viscous coupling with its housing, on the one hand, is supported in the drive housing which accommodates the differential drive and, on the other hand, in a holding member which is secured to the vehicle body.

Furthermore, it is known to integrate the viscous coupling into the drive housing of the differential drive. With such an embodiment, the type of vehicle, depending on whether or not it includes a viscous coupling, requires a different drive housing to accommodate the viscous coupling.

SUMMARY OF THE INVENTION

It is an object of the invention to provide a differential drive which can easily be adapted to different applications, e.g. which can either be used as an open differential drive or which is at least partially lockable and may be combined with a viscous coupling.

In accordance with the invention, to achieve the objective, the differential housing includes a cylindrical bearing face centered on the rotational axis of the driving bevel gear. A rolling contact bearing in a bearing carrier on the coupling housing serves to directly or indirectly support the differential housing. The differential housing, in the region adjoining the bearing face, includes a connecting face which extends radially relative to the rotational axis. The connecting face is provided with at least one connecting bore which extends parallel to the rotational axis. A coupling pin may be inserted into the connecting bore to establish a non-rotating connection between the differential housing and the coupling housing of a viscous coupling. A flange housing is provided secured to the housing and removably accommodates the bearing carrier.

An advantage of this solution is that the housing, which accommodates the differential housing with the associated driving gear, the driving bevel gears and the differential bevel gears, does not have to be modified. Depending on the type of application, a flange housing will be attached which embraces the viscous coupling and the modified bearing means for the differential housing, with the viscous coupling connected therebetween or direct bearing means will be provided for the differential housing and a plug-in shaft to provide a connection with the driveshaft to be connected. The special designs of the differential carrier and of the flange housing permit an axial assembly procedure which enables subsequent installation or a simple replacement for repair purposes.

According to a further embodiment of the invention, it is proposed that to be able to connect the viscous coupling, its coupling housing includes a bearing bore to receive the bearing face and is itself supported in the bearing carrier by means of a bearing seat arranged concentrically relative to the bearing bore and by arranging the rolling contact bearing therebetween. The hub of the viscous coupling, at its end facing away from the bearing carrier, is held in the flange housing by means of a radial bearing. The coupling housing, at its end facing away from the bearing carrier, is supported on the flange housing by means of an axial bearing while at its end associated with the bearing carrier, it may be coupled to the bore of the differential housing by at least one coupling pin associated with the end face.

In this case, the coupling housing of the viscous coupling has the function of supporting the differential housing. The two housings are supported in the bearing carrier which is removably inserted into the flange housing to enable fitting of the viscous coupling. The complete unit, the viscous coupling and plug-in shaft, with reference to the rotational axis, may be attached axially to the housing containing the differential housing. The non-rotating connection with the differential housing is established by the coupling pins.

To connect the driveshaft, preferably a plug-in shaft is provided which is plugged through a bore in the hub so as to extend coaxially relative to the hub and which, at its end, is non-rotatably accommodated in a bore of the driving bevel gear. Furthermore, the plug-in shaft, via teeth, is non-rotatably connected to teeth in the bore of the hub.

Furthermore, the viscous coupling together with the flange housing, the bearing carrier, the rolling contact bearings and the plug-in shaft form a preassembled unit which may be flanged to the housing.

To enable the differential drive to be used as an open, non-lockable differential drive, the differential housing, via its bearing face, is supported in the bearing carrier, with a rolling contact bearing arranged therebetween. A plug-in shaft, connecting a driveshaft, is non-rotatably connected to the driving bevel gear.

From the following detailed description taken in conjunction with the accompanying drawings and subjoined claims, other objects and advantages of the present invention will become apparent to those skilled in the art.

BRIEF DESCRIPTION OF THE PREFERRED EMBODIMENTS

The two possible variants are diagrammatically illustrated in the drawing wherein.

DETAILED DESCRIPTION OF THE DRAWINGS

Figure 1:
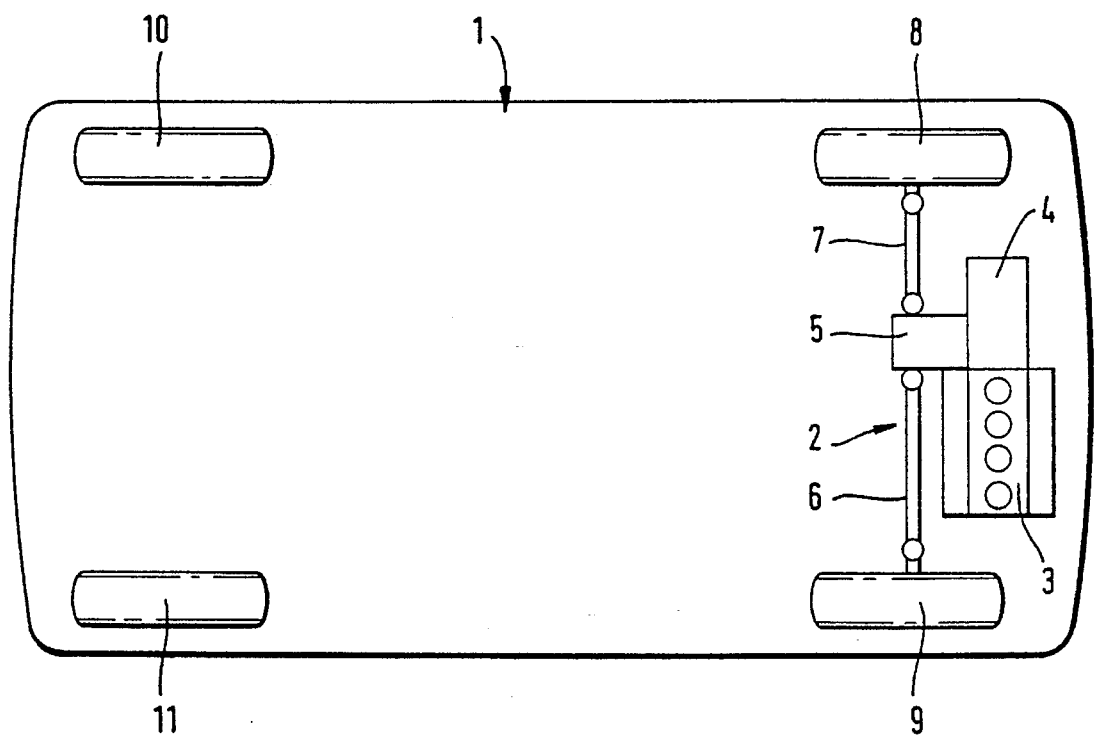
FIG. 1 is a schematic view of a front wheel drive vehicle with a differential drive in accordance with the invention.

FIG. 1 schematically illustrates a motor vehicle 1 which is a front wheel drive passenger car.

The motor vehicle 1 is driven by front axle 2. The drive is effected by engine 3 via gearbox 4, which may be a manual or automatic gearbox, onto the differential drive 5 and from there through the two driveshafts 6, 7 to the two front wheels 8, 9. The two rear wheels 10, 11 are dragged along. The two variants of the differential drive 5 are explained in greater detail with reference to FIGS. 2 and 3.

Figure 2:
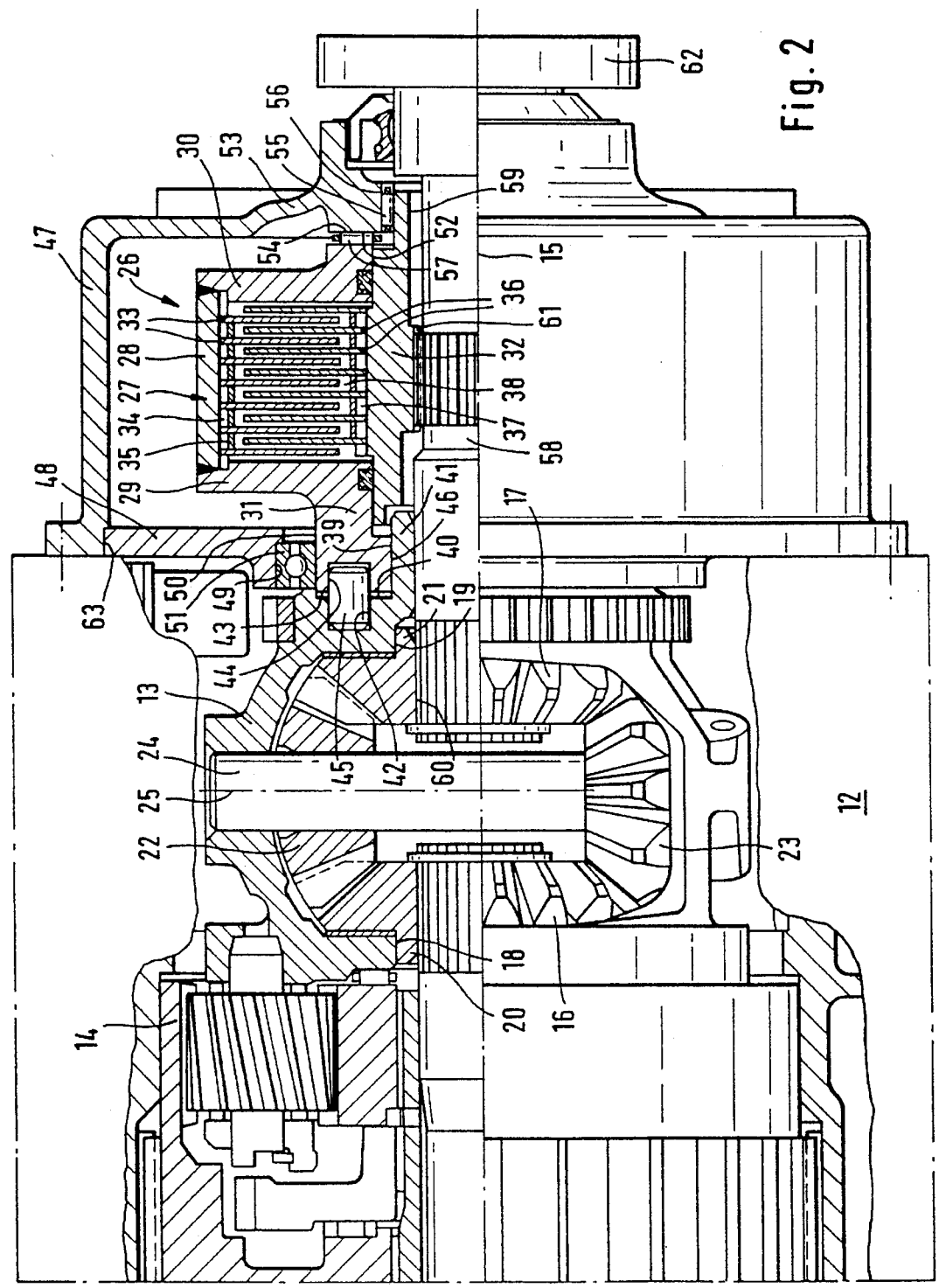
FIG. 2 is a longitudinal sectional view through a differential drive with a flanged-on viscous coupling.

FIG. 2 shows a longitudinal section view of the differential drive 5. The differential drive 5 includes a housing 12 in which a differential housing 13 is rotatably supported around a rotational axis 15. The differential housing 13 may be driven by the vehicle gearbox, via the driving gear 14.

In the differential housing 13, the two driving bevel gears 16, 17 are also arranged around the rotational axis 15 so as to be rotatable relative to the differential housing 13. For this purpose, the driving bevel gears 16, 17 are provided with projections 20, 21 which are rotatably received in bores 18, 19 of the differential housing 13. The driving bevel gears 16, 17 are axially supported against the inner face of the differential housing 13, with supporting discs arranged therebetween.

The two driving bevel gears 16, 17 engage two differential bevel gears 22, 23. The two differential bevel gears 22, 23 are rotatably arranged on a bearing pin 24 whose axis 25 forms a rotational axis 25 for the two differential bevel gears 22, 23. The rotational axis 25 intersects the rotational axis 15 for the two differential bevel gears 16, 17 and the differential housing 13.

The viscous coupling 26 is arranged to adjoin the differential housing 13. The viscous coupling 26 includes a coupling housing 27 with a substantially cylindrical housing casing 28 whose ends are provided with radially inwardly extending covers 29, 30.

The bores of the two covers 29, 30 rotatably accommodate a hub 32. Between the coupling housing 27 and the hub 32 there is formed an operating chamber 38, with outer plates 33 and inner plates 36 alternately arranged in a certain sequence in the operating chamber 38.

The outer plates 33 and inner plates 36 at least partially overlap in the radial direction. The outer plates 33, via their outer circumference, are non-rotatably received in teeth 34 of the housing casing 28. They are spaced relative to one another by spacing rings 35. The inner plates 36 each include a central bore provided with teeth which are non-rotatably and axially movably received in teeth 37 of the hub 32. Instead of the above-mentioned alternating sequence of outer plates 33 and inner plates 36, it is also possible to provide a different sequence; for instance, instead of one inner plate 36, it is possible to provide two inner plates 36 between two outer plates 33.

The remaining part of the operating chamber 38, e.g. the part not occupied by outer plates 33 and inner plates 36 is at least partially filled with a high-viscosity viscous medium, for example silicone oil. When a relative movement occurs between the coupling housing 27 and the hub 32, a reaction moment occurs as a result of the viscous medium being sheared.

The differential housing 13 includes a bearing face 39 which is cylindrical and forms part of the bearing projection 41. The bearing face 39 is centered on the rotational axis 15. The bearing face 39 of the differential housing 13 is followed by a connecting face 40 which extends radially relative to the rotational axis 15. The connecting face 40 includes a plurality of circumferentially distributed connecting bores 42 which extend parallel to the rotational axis 15. The end face 43 of the cover 29 of the coupling housing 27, which also extends radially, is arranged opposite said connecting face 40. The end face 43 is provided with bores 44 which correspond to the connecting bores 42. Both bores, in each case one connecting bore 42 and one bore 44, serve to receive a coupling pin 45 which establishes a non-rotating connection between the differential housing 13 and the coupling housing 27 of the viscous coupling 26. The projection 31 of the cover 29 include a bearing bore 46 which matches the bearing face 39 of the differential housing 13 and receives the bearing projection 41 with the bearing face 39 in a centered way. The cover 29 of the coupling housing 27 is provided with a cylindrical bearing seat 50 which is concentric relative to the bearing bore 46 and which positions a rolling contact bearing 51.

The outer ring of the rolling contact bearing 51 is accommodated in the bore 49 of the bearing carrier 48. The bearing carrier 48 is shaped like a disc whose cylindrical outer face is removably accommodated in a correspondingly cylindrical bearing bore 63 of a flange housing 47. The flange housing 47 rests against a corresponding connecting face of the housing 12 and may be secured thereto by bolts. The flange housing 47 covers the viscous coupling 26 and ends in a radially extending wall 53 which extends approximately parallel to the cover 30 of the viscous coupling 26. The wall 53 includes a bore 56 which serves to support the hub 32 by a radial bearing 55, for example in the form of a needle bearing. To support axial forces, an axial bearing 57 is provided which is arranged between a radially extending end face 54 of the cover 30 of the coupling housing 27 and a supporting face 52 which also extends radially relative to the rotational axis 15 and is provided on the wall 53 of the flange housing 47.

The hub 32 includes a bore which has been given the reference number 59. The bearing projection 41 of the differential housing 13 is also provided with an axially extending through-bore. The driving bevel gear 17 is also provided with a bore 60 which, however, is toothed. The hub 32 is provided with teeth 61. A plug-in shaft 58 extends through the bores and, at is end projecting from the flange housing 47, includes a connecting flange 62 to connect the driveshaft 6 shown in FIG. 1. The plug-in shaft 58 is also provided with teeth which correspond to the teeth 61 of the hub 32. Furthermore, at its end facing away from the connecting flange 62, the plug-in shaft is provided with teeth which match the teeth of the bore 60 of the driving bevel 17. By inserting the plug-in shaft 58 it is possible to achieve a non-rotating connection between the differential housing 13 and the coupling housing 27. The outer plates 33 and the inner plates 36 rotate relative to one another if a relative movement occurs between the differential housing 13 and the driving bevel gear 17. The driving bevel gear 16 is also provided with a toothed bore which is engaged by the plug-in shaft which projects from the housing 12 and connects the lefthand driveshaft 7 which is illustrated in FIG. 1 and serves to establish a driving connection with the front wheel 8.

Figure 3:
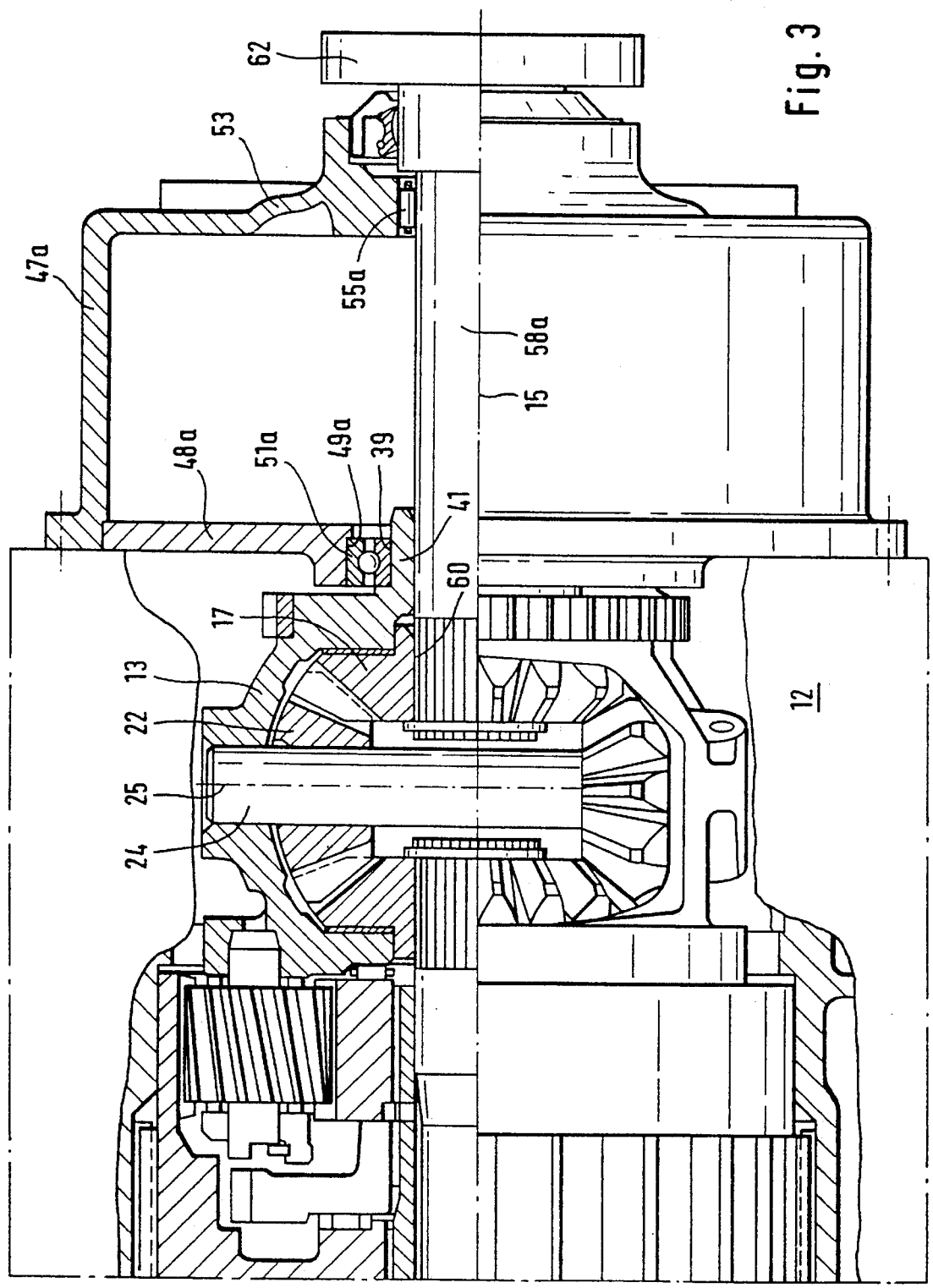
FIG. 3 is a longitudinal sectional view of a second embodiment through a differential drive without a lock, with the differential housing including a bearing carrier flanged onto the housing.

FIG. 3 shows a modified embodiment, incorporating a flange housing 47a which does not serve to receive a viscous coupling 26. The flange housing 47a includes a bearing carrier 48a which is provided with a bearing bore 49a whose diameter is smaller than that of the embodiment illustrated in FIG. 2. The diameter of the rolling contact bearing 51a is also reduced as compared to the diameter shown in FIG. 2. The rolling contact bearing 51a serves to directly support the differential housing 13 by directly accommodating the bearing projection 41 with its bearing face 39. At the same time, the rolling contact bearing 51a may serve to receive the axial forces. Into the flange housing 47a a plug-in shaft 58a is inserted whose end facing away from the flange 62 includes teeth which match the toothed bore 60 of the driving bevel gear 17. The plug-in shaft 58a is additionally supported in the wall 53 of the flange housing 47a by means of a radial bearing 55a. The flange housing 47a is flanged to the housing 12. This embodiment has the function of an open differential drive. The axial dimensions of the flange housing 47a correspond to those of the flange housing 47 according to FIG. 2 to ensure that the distance between the flange 62 and the connection of the driveshaft does not change relative to the rotational axis 25 of the bearing pin 24. In this way it is ensured that although there are two different variants, the lengths of the driveshafts 6 to be selected for establishing a rotating connection of the front wheels 9 do not change.

While the above detailed description describes the preferred embodiment of the present invention, the invention is susceptible to modification, variation, and alteration without deviating from the scope and fair meaning of the subjoined claims.

I claim:

1. A differential drive comprising:

a rotatably driven differential housing supported in a housing;

two driving bevel gears are equi-axially arranged and rotatably supported in said differential housing;

at least two differential bevel gears which engage the driving bevel gears are rotatably supported in the differential housing around a rotational axis which intersects a rotational axis of the driving bevel gears at a right angle;

means for arranging a viscous coupling next to the differential housing, said viscous coupling including a coupling housing and a hub arranged coaxially around one another and rotatably relative to one another, formed between said coupling housing and said hub, an operating chamber radially overlapping outer plates and inner plates, in a certain sequence, non-rotatably associated with said coupling housing and the hub in said operating chamber; and the remaining part of the operating chamber at least partially filled with a highly viscous medium, said viscous coupling may be arranged between the differential housing and the driving bevel gear, with the coupling housing of the viscous coupling connectable to the differential housing and said hub via the driving bevel gear and coupling means;

said differential housing includes a cylindrical bearing face centered on the rotational axis of the driving bevel gear;

a rolling contact bearing in a bearing carrier on said coupling housing directly or indirectly supporting the differential housing;

said differential housing, in a region adjoining said bearing face, including a connecting face which extends radially relative to the rotational axis, at least one connecting bore in said connecting face which extends parallel to the rotational axis, at least one coupling pin insertable in said at least one connecting bore for establishing a non-rotating connection between the differential housing and the coupling housing of a viscous coupling; and a flange housing secured to the housing which removably accommodates the bearing carrier.

2. A differential drive according to claim 1, wherein to be able to connect the viscous coupling its coupling housing includes a bearing bore for receiving the bearing face and is itself supported in the bearing carrier by a bearing seat arranged concentrically relative to the bearing bore and by arranging the rolling contact bearing therebetween, the hub of said viscous coupling, at its end facing away from the bearing carrier, is held in the flange housing by a radial bearing, and said coupling housing, at its end facing away from the bearing carrier is supported on the flange housing by an axial bearing while at its end associated with the bearing carrier it may be coupled to the bore of the differential housing by said at least one coupling pin associated with the end face thereof.

3. A differential drive according to claim 2, wherein a plug-in shaft for connecting a driveshaft is plugged through a bore in the hub so as to extend coaxially relative to said hub and that the end thereof is non-rotatably accommodated in a bore of the driving bevel gear and non-rotatably connected to a set of teeth in the bore of the hub by teeth.

4. A differential drive according to claim 1, wherein the viscous coupling, together with the flange housing, the bearing carrier, the rolling contact bearings and a plug-in shaft form a preassembled unit which may be flanged to the housing.

5. A differential drive according to claim 1, wherein, to enable the drive to be used as a non-lockable differential drive, the differential housing, by its bearing face is supported in the bearing carrier, with a rolling contact bearing arranged therebetween, and a plug-in shaft connecting a driveshaft is non-rotatably connected to the driving bevel gear.

6. A differential drive according to claim 3, wherein the viscous coupling, together with the flange housing, the bearing carrier, the rolling contact bearings and a plug-in shaft form a preassembled unit which may be flanged to the housing.

* * * * *